United States Patent [19]
Ollivier

[11] Patent Number: 5,732,736
[45] Date of Patent: Mar. 31, 1998

[54] PRESSURE REGULATOR WITH LOWER OUTLET PRESSURE DROP

[75] Inventor: Louis A. Ollivier, Palo Alto, Calif.

[73] Assignee: Veriflo Corporation, Richmond, Calif.

[21] Appl. No.: 616,922

[22] Filed: Mar. 18, 1996

Related U.S. Application Data

[63] Continuation of Ser. No. 275,262, Jul. 15, 1994, abandoned.

[51] Int. Cl.$^6$ .................................................. G05D 16/02
[52] U.S. Cl. ........................................ 137/505.41; 137/613
[58] Field of Search .......................... 137/14, 505, 505.35, 137/505.41, 505.13, 505.15, 613

[56] References Cited

U.S. PATENT DOCUMENTS

| | | | |
|---|---|---|---|
| 508,133 | 11/1893 | Gold | 137/505.35 |
| 1,173,835 | 2/1916 | Metzger | 137/505.35 X |
| 1,174,661 | 3/1916 | Boyd | 137/505.35 |
| 2,016,234 | 10/1935 | Hughes | 137/505.41 X |
| 2,693,823 | 11/1954 | Sogge | 137/505.41 X |
| 2,715,416 | 8/1955 | McKinley | 137/505.41 X |
| 2,904,068 | 9/1959 | St. Clair | 137/505.41 |
| 3,035,608 | 5/1962 | Ray | 137/505.41 |
| 3,289,692 | 12/1966 | Dunn | 137/505 |
| 4,275,764 | 6/1981 | Baret | 137/505.41 X |
| 4,898,204 | 2/1990 | Wallace | 137/505.41 |

*Primary Examiner*—Stephen M. Hepperle
*Attorney, Agent, or Firm*—Antonelli, Terry, Stout & Kraus, LLP.

[57] ABSTRACT

A fluid pressure regulator and a method of regulating involve configuring a valve and valve seat of the regulator such that as the valve is moved relative to the valve seat from a closed or nearly closed position of a throttled fluid passage in the regulator to a full flow position, the throttled fluid passage is opened at a rate in relation to the movement of the valve relative to the valve seat which increases during travel of the valve. In one disclosed form of the fluid pressure regulator, a first portion of the outer surface of the valve which contacts the valve seat when the valve closes the throttled fluid passage is tapered with respect to a direction of movement of the valve relative to the valve seat. A second portion of the outer surface of the valve arranged on a valve seat side of the first portion is oriented substantially more steeply with respect to the direction of movement of the valve relative to the valve seat than the tapered first portion for changing the rate of opening of the fluid passage in relation to the movement of the valve during movement of the valve relative to the valve seat. The regulator enables relatively high flow through the regulator, up to 500 to 1000 l/min or more, with a relatively small change in outlet pressure over the range of flow from no or low flow to high flow.

7 Claims, 2 Drawing Sheets

PRESSURE REGULATOR WITH LOWER OUTLET PRESSURE DROP

RELATED APPLICATION

This application is a continuation of Ser. No. 08/275,262, filed Jul. 15, 1994, now abandoned.

FIELD OF THE INVENTION

The present invention relates to an improved fluid pressure regulator and a method of regulating the fluid pressure dispensed from a supply of pressurized fluid, particularly a pressurized processing gas for making a semiconductor, and to a method and apparatus for making a semiconductor therewith.

BACKGROUND OF THE INVENTION

The function of a pressure regulator is to deliver the flow of a fluid at a regulated pressure and to maintain that pressure at a set value independently of the flow. For that purpose the pressure regulator is supplied at its inlet port by a source of fluid at a pressure substantially higher than the desired outlet pressure. The desired outlet pressure is set and the regulator automatically actuates a variable passage between its inlet and outlet ports to minimize the difference between the actual outlet pressure and the pressure setting.

Internally, a conventional pressure regulator operates on a force balance principle. A diaphragm assembly is subjected to forces acting in opposite directions. These forces include a first force acting in a first direction and related to the pressure setting (generally created by the manual compression of a spring), a second force in a second direction opposite said first direction and created by the outlet pressure applied to the effective area of the diaphragm, and a third force applied to the diaphragm in the second direction by way of a valve of the regulator. The first force of the pressure setting is constant. Any variation of the outlet pressure will change the second, opposing force applied to the diaphragm. The imbalance between the opposing forces will deflect the diaphragm. The deflection is transmitted directly to the valve which cooperates with a stationary seat to vary the passage area of a fluid passage between the valve and the seat and, as a result, vary the flow from the inlet of the regulator to its outlet. For example, an increase in outlet flow, e.g. the flow rate can be expressed in units of liters/minute (l/min), will tend to decrease the outlet pressure and thereby the second, opposing force applied to the diaphragm by the outlet pressure.

The force imbalance will deflect the diaphragm and will move the valve in a direction to increase the passage area. This will increase the flow and a new steady state condition will be created in which the outlet pressure will be smaller than the one that existed at the previous flow. Conversely, if the flow had decreased the flow imbalance would have moved the valve to decrease the passage area and reduce the flow. A new combination would have been created in which the outlet pressure would have been greater than at the previous flow. This automatic operation shows that some change in outlet pressure is required to accommodate a change in outlet flow. The purpose of pressure regulation is to minimize the change in outlet pressure for a given range of flow variation.

Two other factors of performance have also to be considered: one is the effect of inlet pressure changes on the regulated outlet pressure, the other is the change in outlet pressure as the flow is shut off, which expresses the ability of the pressure regulator to shut off effectively at zero flow.

A change in inlet pressure affects the balance of forces. The inlet pressure applied to the area of the valve passage creates the aforementioned third force which is opposed to that of the first, pressure setting force. If the inlet pressure is decreased, the third force that it creates will be smaller. The force balance will be restored by increasing the outlet pressure. This will happen automatically in the following sequence: a decrease in inlet pressure decreases the third force opposing the first setting force, the diaphragm assembly increases the opening of the valve, the flow across the valve is increased and the outlet pressure is increased to a new value which restores the force balance.

The relationship between the inlet pressure decrease and the outlet pressure increase is determined by the ratio of the effective areas of the valve passage and the diaphragm. For a detailed analysis of the inlet pressure effect refer to my earlier U.S. Pat. No. 5,230,359 entitled Supply Pressure Compensated Fluid Pressure Regulator And Method.

In practice there are two principal groups of conventional pressure regulators: those operating at inlet pressures of 200 to 3,000 psi with an effect on outlet pressure of 0.5 to 1.0 psi per 100 psi change in the inlet pressure, and those operating at inlet pressures of 30 to 500 psi with an effect on outlet pressure of 2–4 psi per 100 psi change in inlet pressure. The change in outlet pressure with variations in gas flow rate through the regulator is greater with regulators of the second group, namely those operating at lower inlet pressures, 30 to 500 psi. The pressure regulator of the present invention disclosed herein belongs to the second group and is an improvement thereof affording a lower outlet pressure drop over the permissible variation or range of flow through the regulator from no flow or low flow to a high or the highest flow.

There is a particular need to have as stable a supply of gas pressure as possible in methods and apparatus for making semiconductors. The required flow rates for processing gases and making semiconductors can vary from no or low flow to high flow. Gas flow regulating devices such as mass flow controllers used in apparatus for making semiconductor devices are highly accurate if a stable gas inlet pressure to these flow regulating devices can be maintained. However, undesirably large pressure drops with changes in the flow demands of a gas distribution systems can reduce the accuracy of these flow regulating devices and make it difficult to obtain uniform characteristics of the semiconductors. For example, growing semiconductor layers or oxide insulation layers during semiconductor making would occur at a lower rate, e.g. the layers would be thinner with a relatively larger pressure drop as compared with a relatively smaller pressure drop. Yields per batch in making semiconductor devices are improved where regulator outlet pressure variations are reduced.

SUMMARY OF THE INVENTION

An object of the present invention is to provide an improved fluid pressure regulator and method of regulating fluid pressure having a lower outlet pressure drop as a result of flow variation over a flow range of the regulator from no flow or low flow to high flow, for a given outlet pressure setting of the regulator.

A further object of the present invention is to provide an improved fluid pressure regulator and method of regulating fluid pressure of the type capable of operating at inlet pressures of 30 to 500 psi and at outlet pressures set at 15 to 150 psi and capable of delivering the pressurized gas at a high flow of up to 500 to 1000 l/min or more with a relatively lower outlet pressure drop over the range of flow of the regulator as compared with conventional regulators.

An additional object of the invention is to provide an improved method and apparatus for making a semiconductor utilizing the method of regulating and the fluid pressure regulator of the invention for supplying a processing gas for making a semiconductor whereby more uniform characteristics of the semiconductors and higher yields per batch can be achieved.

These and other objects of the invention are attained by the improved fluid pressure regulator of the invention which comprises: a fluid passage for the flow of pressurized fluid; a valve movably positioned in the regulator for adjustably throttling the fluid passage and the flow of pressurized fluid therethrough; a diaphragm which can be deflected in response to a force imbalance for moving the valve; a device for supplying a first force on the diaphragm in a first direction, pressurized fluid downstream of the throttled passage applying a second force on the diaphragm in a second direction opposite the first direction, a third force being applied to the diaphragm in the second direction by way of the valve, the third force being a function of the pressure of fluid supplied to the throttled passage which acts on the valve; and a valve seat having an aperture extending therethrough which defines a portion of the fluid passage. The valve cooperates with the valve seat about its aperture for adjustably throttling the fluid passage. The valve has an outer surface with a first portion which in a first position of the valve contacts the valve seat to close the fluid passage and the valve being movable relative to the valve seat from the first position with deflection of the diaphragm to progressively open the fluid passage. The first portion of the outer surface of the valve which contacts the valve seat is tapered with respect to a direction of movement of the valve relative to the valve seat. The outer surface of the valve further includes a second portion arranged on a valve seat side of the first outer surface portion of the valve, the second portion being oriented substantially more steeply with respect to the direction of movement of the valve relative to the valve seat than the tapered first portion. As a result of these features of the invention, the valve seat and valve are configured such that as the valve is moved relative to the valve seat from the first position the fluid passage is opened at a rate in relation to the movement of the valve relative to the valve seat which increases during travel of the valve.

In a disclosed, preferred embodiment of the fluid pressure regulator, the first portion of the outer surface of the valve tapered at an angle of 30° to 40° with respect to the direction of movement of the valve relative to the valve seat. The second portion of the outer surface of the valve is perpendicular to the direction of movement of the valve relative to the valve seat, and is adjacent the first portion.

A method of regulating the fluid pressure dispensed from a source of pressurized fluid such as a high pressure gas according to the invention utilizes a fluid pressure regulator of the aforementioned type. The method comprises forming the valve seat and the valve of the regulator such that as the valve is moved relative to the valve seat from a first position where the throttled passage is closed or nearly closed the fluid passage of the regulator is opened at a rate in relation to the movement of the valve relative to the valve seat which increases during travel of the valve.

This method of regulating fluid pressure and the fluid pressure regulator of the invention are preferably employed in the improved method and apparatus for making a semiconductor of the invention. More particularly, an apparatus of the invention for making a semiconductor comprises a supply of a processing gas for making a semiconductor, processing equipment which utilizes the processing gas in making a semiconductor and at least one pressure regulator for regulating the pressure of the processing gas supplied to the processing equipment from the supply of processing gas, wherein the at least one pressure regulator is a pressure regulator according to the invention. In the disclosed, preferred embodiment, the apparatus further comprises a flow regulating device for regulating the flow of the processing gas to the processing equipment from the at least one pressure regulator. The flow regulating device is a mass flow controller in the disclosed embodiment, but other flow regulating devices, such as a calibrated orifice, could be employed. The improved stability of the outlet pressure of the regulator results in a more stable inlet pressure to the mass flow controller or other flow regulating device whereby the mass flow of the processing gas to the processing equipment, e.g. the number of molecules/concentration of the processing gas per unit time, can be highly accurate both during conditions of stable flow as well as widely varying, transient flow. This leads to the production of semiconductors having more uniform characteristics wherein the yields per batch are improved.

These and other objects, features and advantages of the present invention will become more apparent from the following description of several embodiments of the invention.

DETAILED DESCRIPTION OF THE DISCLOSED EMBODIMENTS

Figure 1:
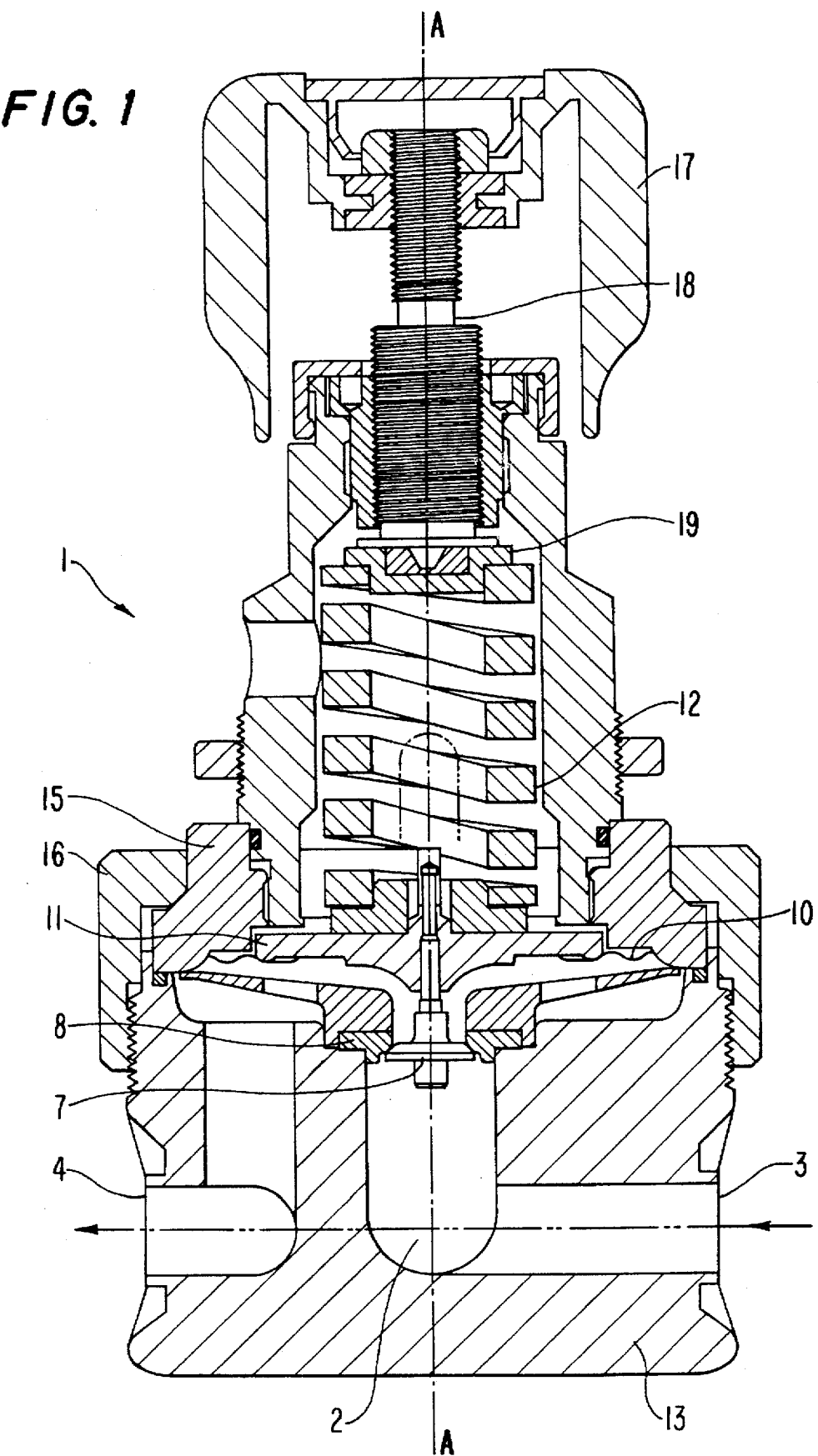
FIG. 1 is a cross sectional view of a fluid pressure regulator according to a preferred embodiment of the invention taken along the central, longitudinal axis of the diaphragm assembly and illustrating the valve in a position seated against the valve seat to close a fluid passage through the regulator.
Figure 2:
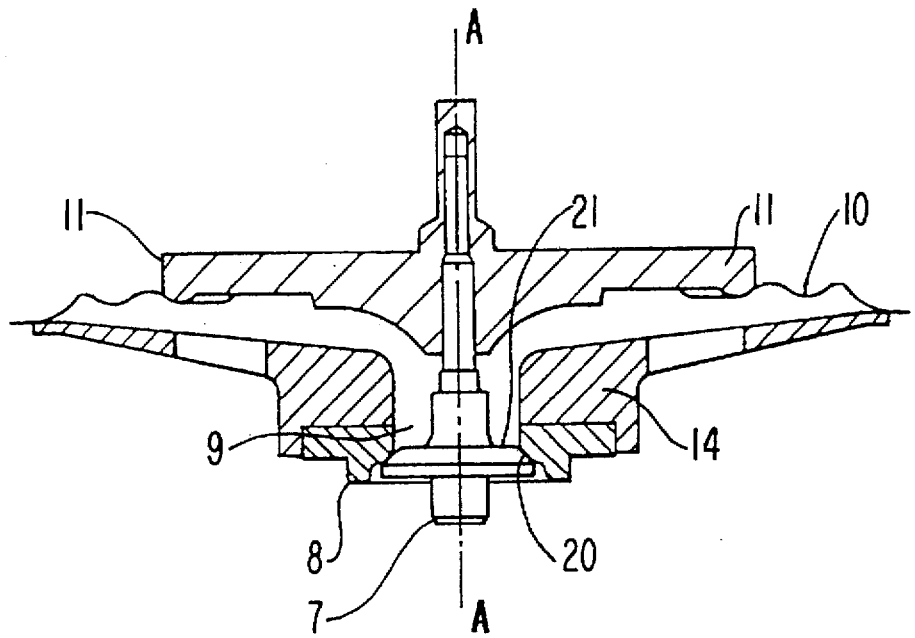
FIG. 2 is a cross sectional view like that in FIG. 1 illustrating a portion of the regulator, particularly the diaphragm assembly, compression member, valve seat and valve in a position wherein the fluid passage through the valve seat is closed by the valve.
Figure 3:
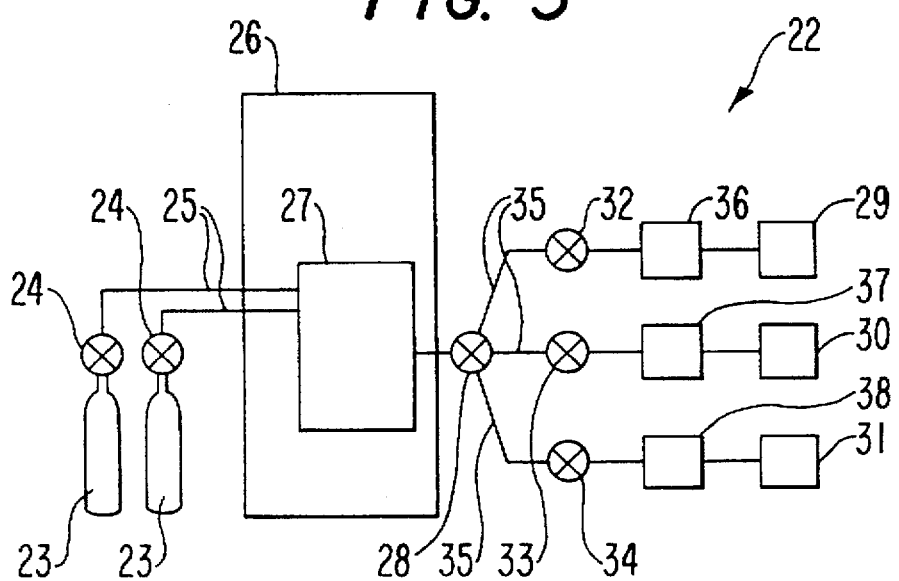
FIG. 3 is a schematic illustration of an apparatus for making a semiconductor according to the invention utilizing fluid pressure regulators of the invention as illustrated in FIGS. 1 and 2.

Referring now to the drawings, a fluid pressure regulator 1 according to an embodiment of the invention as depicted in FIGS. 1 and 2 comprises a fluid passage 2 which extends through the regulator between an inlet 3 and an outlet 4 of the regulator. The regulator is adapted to be used in combination with a supply of pressurized fluid, such as a pressurized processing gas for making semiconductors, wherein the gas is under a pressure of 30 to 500 psi. An example of such a supply is shown in the apparatus of FIG. 3 as discussed hereinafter. Threaded fittings, not shown, are provided on the regulator about the inlet and outlet of the fluid passage 2 for threaded attachment of the regulator in the apparatus of FIG. 3.

A poppet valve 7 is movably positioned in the regulator 1 for adjustably throttling the fluid passage 2 at a valve seat 8 about an aperture 9 extending therethrough which forms part of the fluid passage 2 through the regulator. A diaphragm 10, illustratively formed of 316 stainless steel of a thickness so that it is flexible, is located in the regulator. The diaphragm is deflected in response to a force imbalance thereon for moving the valve. The upper end of the valve 7 is received within a passage in a pressure plate 11 which is sealingly connected to the diaphragm 10 as by welding. The pressure plate is crimped against the upper end of the valve to form an assembly such that the valve is moved relative to the valve seat 8 along a central axis A—A of the valve 7, diaphragm 10 and pressure plate 11, in response to a force imbalance thereon.

A coil spring 12 which extends along the axis A—A applies a first force on the diaphragm 10 in a first, downward direction along axis A—A as shown in FIG. 1. The spring force is applied to the diaphragm by way of the pressure plate 11. Pressurized fluid downstream of the throttled passage between the valve seat 8 and valve 7 applies a second force on the diaphragm in a second direction opposite the first direction. A third force is applied to the diaphragm by way of the valve 7. The third force is a function of the pressure of the fluid supplied to the throttled passage through inlet 3 which acts on the valve. Thus, the regulator 1 operates on a force balance principle where the force applied by the spring 12 is balanced by the force created by the outlet pressure on the diaphragm and the force created by the supply pressure against the valve 7 on an area determined by the size of the aperture 9 through the valve seat. Any imbalance will result in a deflection of the diaphragm and movement of the valve to restore the balance.

The valve seat 8 in the regulator 1 is clamped at a radially outer portion thereof between the valve body 13 and a compression member 14 by way of a base 15 and a clamp nut 16 which is threadedly attached to an outer surface of the valve body 13.

The valve seat in the disclosed embodiment is formed of KELF, a polymer of chlorotrifluoroethylene, but other materials could be employed. The diameter of the aperture or valve passage 9 through the valve seat is preferably within the range of 0.25 to 1.00 inch. In the disclosed embodiment the diameter is 0.34 inch. The poppet valve 7 of the regulator 1 is formed of 316 stainless steel as is the diaphragm 10.

The spring 12 applies an adjustable force to the diaphragm 10 for setting the outlet pressure of the regulator. This is accomplished by rotation of the adjustment knob 17 of the regulator which axially positions a threaded stem 18 along the axis A—A to adjustably tension the coil spring 12 through an intermediate button assembly 19.

During operation of the fluid pressure regulator, the adjustably throttled passage area in the regulator is an annular space between the valve 7 and the valve seat 8. In a position of the valve when no flow is required, the valve is actuated by the diaphragm to move against the valve seat and create an effective sealing condition. For this purpose, according to the invention, it is preferred that the outer surface of the valve be formed with a first portion 20 which contacts the valve seat to close the fluid passage in a first position of the valve, when no flow is required. Preferably, this first portion of the outer surface of the valve is tapered at an angle of 30° to 40° with respect to the direction of movement of the valve, along the axis A—A, relative to the valve seat. This degree of taper provides an effective seal with the valve seat with a minimum of force and thus a minimum of change in outlet pressure of the regulator.

Because the valve is tapered, as the valve is moved away from the valve seat, the effective change of the passage area is a fraction of the change in travel of the valve along the axis A—A. If the taper angle is 30°, the incremental change in the width of the throttled flow passage is one-half of the incremental change in the displacement of the valve (the ratio is equal to the sine of the taper angle). If the taper angle is increased to 40°, the ratio goes from 0.5 to 0.64, an increase of 28%.

In order to reduce the outlet pressure drop of the regulator with flow variation from this no flow or low flow rate to high flow, according to the invention the outer surface of the valve 7 further includes a second portion 21 arranged on the valve seat side of the first outer surface portion 20 of the valve, the second portion being oriented substantially more steeply with respect to the direction of movement of the valve relative to the valve seat, axis A—A, than the tapered first portion. As shown in FIGS. 1 and 2, the second portion 21 of the outer surface of the valve is adjacent the first portion 20 and the length of the tapered first portion 20 above the surface thereof which contacts the valve seat when no flow is required, is preferably kept to a minimum, substantially less than the travel distance of the valve over the permissible range of flow through the regulator for a given regulator pressure setting and supply pressure. As a result, as the valve leaves the seat to open progressively, the incremental change of the passage will at first be a fraction of the incremental displacement (ratio of 0.64 at 40° taper); then, as the end of the tapered first portion clears the seat, the incremental change of the passage is substantially increased approaching that of the displacement of valve along the axis A—A (ratio of 1 at 90°). From that point on, an incremental change in the outlet pressure will produce a greater incremental change in the flow delivered by the pressure regulator.

The improved fluid pressure regulator of the invention makes it possible for the regulator to deliver a large flow with a smaller pressure drop in the outlet pressure. As an example, a conventional pressure regulator used to deliver a flow of 300 l/min at an inlet pressure of 80 psi and an outlet pressure setting of 30 psi with a pressure drop of 10 psi over a flow range from a no flow condition to 300 l/min, but when designed according to the present invention, as shown in FIGS. 1 and 2, can deliver the same flow under the same conditions with a pressure drop of only 6 psi. The travel of the valve along the axis A—A over this range of flow in the regulator 1 of the example of the invention was 0.050 inch. The height of the first, tapered portion 20 along the axis A—A above the area of contact with the valve seat 8 was substantially less than this travel distance, only 0.020 inch so that the first portion cleared the cooperating tapered surface on the valve seat opening from no flow to high flow.

An apparatus 22 according to the invention for making a semiconductor is illustrated in FIG. 3. The apparatus comprises high pressure gas cylinders 23 which contain high pressure gas, for example at a pressure of 2000 psi, for use as processing gas in the apparatus for making semiconductors. A first, conventional pressure regulator 24 is provided on each of these gas cylinders for reducing the gas pressure from 2000 to 80–200 psi. Gas is conveyed from the regulators 24 by a gas distribution system which includes stainless steel tubing 25 into a building 26. A second pressure regulator 28, which is a pressure regulator according to the present invention as shown in FIGS. 1 and 2, adjusts the pressure of the gas from the 80–200 psi of the gas conveying system 27 to an outlet pressure of 15–30 psi. This lower pressure gas is conveyed to semiconductor processing equipment 29, 30 and 31 by way of further respective fluid pressure regulators 32, 33 and 34 according to the present invention as shown in FIGS. 1 and 2. The regulators 32–34 receive the pressurized gas at a pressure of 15–30 psi from the regulator 26 by way of respective stainless steel tubing 35 and reduce the pressure thereof to an outlet pressure of 2–3 psi, for example. Flow regulating devices 36, 37 and 38 in the form of mass flow controllers are located in the respective gas lines between the respective regulators 32–34 and the downstream semiconductor processing equipment which utilizes the processing gas supplied thereto in making semiconductors.

The reduced outlet pressure drop with the regulators of the invention at 28 and 32–34, together with the flow regulating devices, mass flow controllers 36–38, allow a stable supply of processing gas to be delivered to the processing equipment both in conditions of steady state flow as well as transient flow. This contributes to the manufacture of semiconductors having more uniform characteristics and improved yields per batch.

While I have shown and described only several embodiments of the present invention herein, it will be readily understood by the skilled artisan that variations of the fluid pressure regulator and method of regulating and also the apparatus for making a semiconductor and the related method are possible without departing from the scope of my invention. There are in excess of thirty different processing gases for making semiconductors. The pressure and flow rates required in using these gases vary widely. The design of the regulator can be adjusted accordingly depending upon the desired pressures and flow rates without departing from the invention. Further, while the first and second portions of the outer surface of the valve are linear as seen in the illustrations of the valve of the disclosed embodiment, multiple tapers or a curved surface could be employed for changing over the rate of change of the size of valve passage with respect to the travel of the valve during the normal operation of the valve over the range of flow through the regulator from no flow or low flow to the highest flow. The regulator of the invention is a modulating instrument for controlling outlet pressure throughout the range of flow through the regulator. Thus, the invention has applicability even in the case of a regulator incapable of completely shutting off the flow, as where an upstream valve is provided to close the pressurized gas supply line in case flow rates drop below a determined amount. Therefore, I do not wish to be limited to the details shown and described herein but intend to cover all such changes and modifications as are encompassed by the scope of the appended claims.

I claim:

1. An apparatus for making a semiconductor, said apparatus comprising a supply of pressurized processing gas for making a semiconductor, processing equipment which utilizes said processing gas in making a semiconductor, at least one fluid pressure regulator for regulating the pressure of said processing gas supplied to said processing equipment from said supply of pressurizing processing gas, said at least one pressure regulator comprising:

a fluid passage having an inlet and an outlet for the flow of pressurized processing gas from said supply of processing gas through said regulator;

a poppet valve movably positioned in said regulator for movement along an axis of said regulator a travel distance between a first, closed position wherein said fluid passage is closed by said valve and a second, maximum flow position for adjustably throttling said fluid passage and the flow of pressurized fluid therethrough over a permissible range of flow through the regulator from no flow to said maximum flow for a given regulator outlet pressure setting and pressure of said processing gas supplied to said fluid passage of said regulator from said supply;

a diaphragm which can be deflected in response to a force imbalance thereon for moving said valve;

a pressure plate connected to said diaphragm and said valve being connected to said pressure plate to form an assembly of said diaphragm, pressure plate and valve for moving said valve with said deflection of said diaphragm;

a device for applying a first, regulator outlet pressure setting force on the diaphragm in a first direction by way of said pressure plate, pressurized processing gas immediately downstream of said throttled passage uninterruptedly applying a second force on the diaphragm in a second direction opposite said first direction, a third force being applied to said diaphragm in said second direction by way of said valve and said pressure plate, said third force being a function of the pressure of processing gas supplied to said throttled passage which acts on said valve;

a valve seat having an aperture extending therethrough which defines a portion of said fluid passage, said valve cooperating with said valve seat about its aperture for adjustably throttling said fluid passage, said valve having an outer surface with a first portion which in said first position of said valve contacts a part of said valve seat to close said fluid passage so that there is no flow of pressurized processing gas through said fluid passage and said valve being movable along said axis of said regulator relative to said valve seat from said first, no-flow position over said travel distance to said second position with deflection of said diaphragm to progressively open said fluid passage, wherein said first portion of the outer surface of said valve which contacts said valve seat is tapered with respect to said direction of movement of said valve relative to said valve seat along said axis, and the outer surface of said valve further including a second portion arranged on a valve seat side of and adjoining said first outer surface portion of said valve and being oriented substantially more steeply with respect to said direction of movement of said valve relative to said valve seat than said tapered first portion, and wherein when said valve is in said first position said second portion of the outer surface of said valve and said part of the valve seat contacted by said first portion of the outer surface of said valve are arranged at a first distance with respect to one another in the direction of movement of the valve along said axis, said first distance being less than half of said travel distance of said valve in said direction of movement along said axis from said first position to said second position during progressive opening of said fluid passage and wherein said first distance is less than $1/12$ of the diameter of said aperture extending through said valve seat, whereby both said first portion and said second portion of said valve combine during said movement of said valve over said travel distance to progressively and non-linearly open said fluid passage so that said fluid passage is opened at a rate in relation to said movement of the valve relative to the valve seat which allows the flow of the process gas to increase slowly at initial movement of said valve over said travel distance and to increase very rapidly thereafter during movement of said valve over said travel distance for maintaining a stable outlet gas pressure of said regulator over said permissible range of flow through said regulator to said processing equipment during conditions of stable flow as well as widely varying, transient flow.

2. The apparatus according to claim 1, wherein said first portion of the outer surface of said valve is tapered at an angle of 30° to 40° with respect to said direction of movement of said valve relative to said valve along said axis seat.

3. The apparatus according to claim 1, wherein said second portion of the outer surface of said valve is perpendicular to said direction of movement of said valve along said axis relative to said valve seat.

4. The apparatus according to claim 1, wherein said regulator is capable of very high flow of up to 500 to 1000 l/min or more with a inlet pressure within the range of 30 to 500 psi and an outlet pressure within the range of 15 to 150 psi.

5. The apparatus according to claim 1, wherein said device for applying said first force on the diaphragm includes a spring.

6. The apparatus according to claim 1, further comprising a flow regulating device for regulating the flow of said processing gas to said processing equipment from said at least one pressure regulator.

7. An apparatus according to claim 6, wherein said flow regulator device is a mass flow controller.

* * * * *